T. CARROLL AND J. C. LOCKYER.
PERFORATING MECHANISM FOR CASH REGISTERS.
APPLICATION FILED FEB. 5, 1915.
1,320,673.
Patented Nov. 4, 1919.
6 SHEETS—SHEET 1.
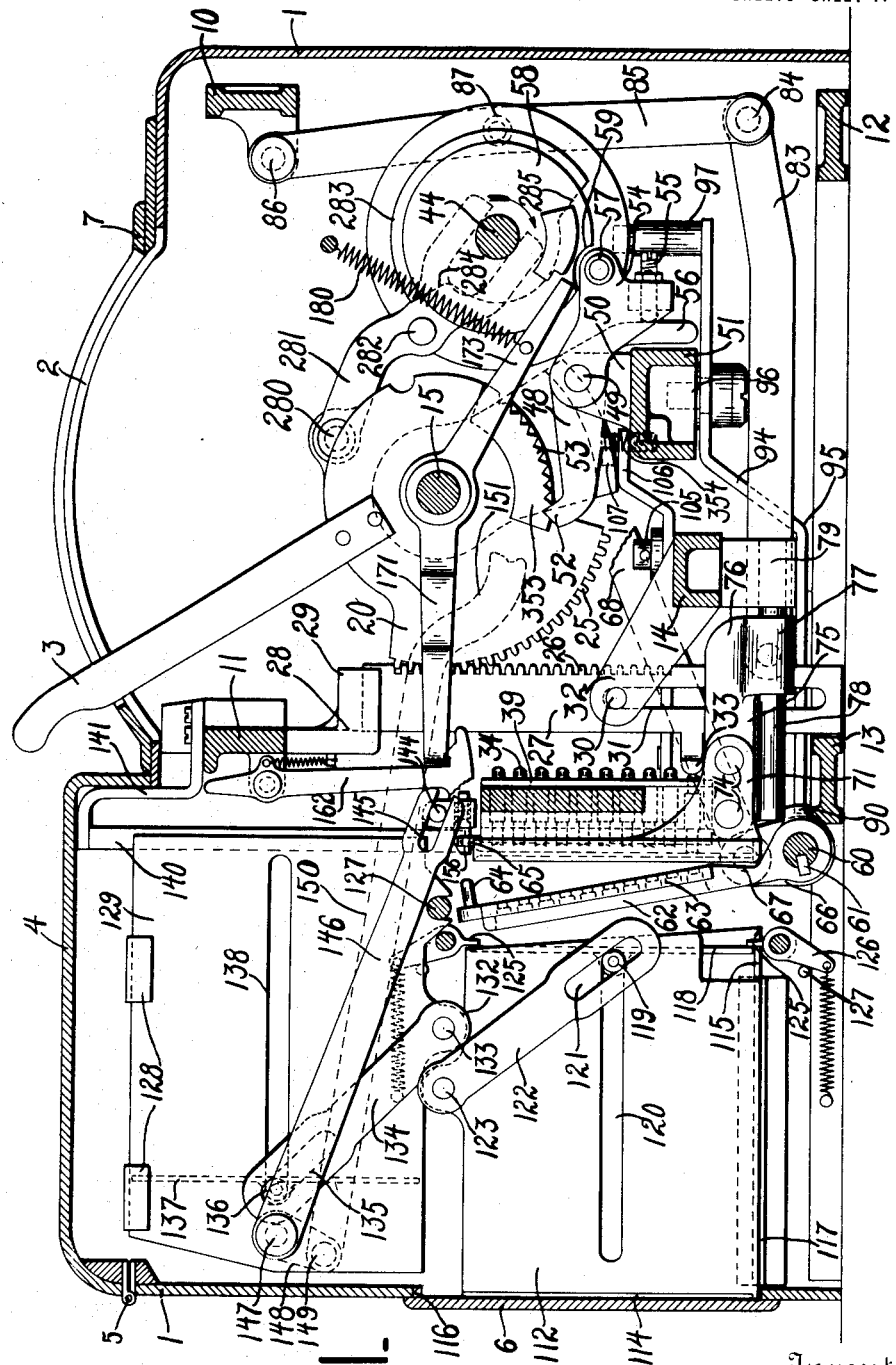
Witnesses
Carl N. Bogan
J. B. Ricketts
Inventor
Thomas Carroll and John C. Lockyer
by R. C. Glass
Carl Bent
Attorneys

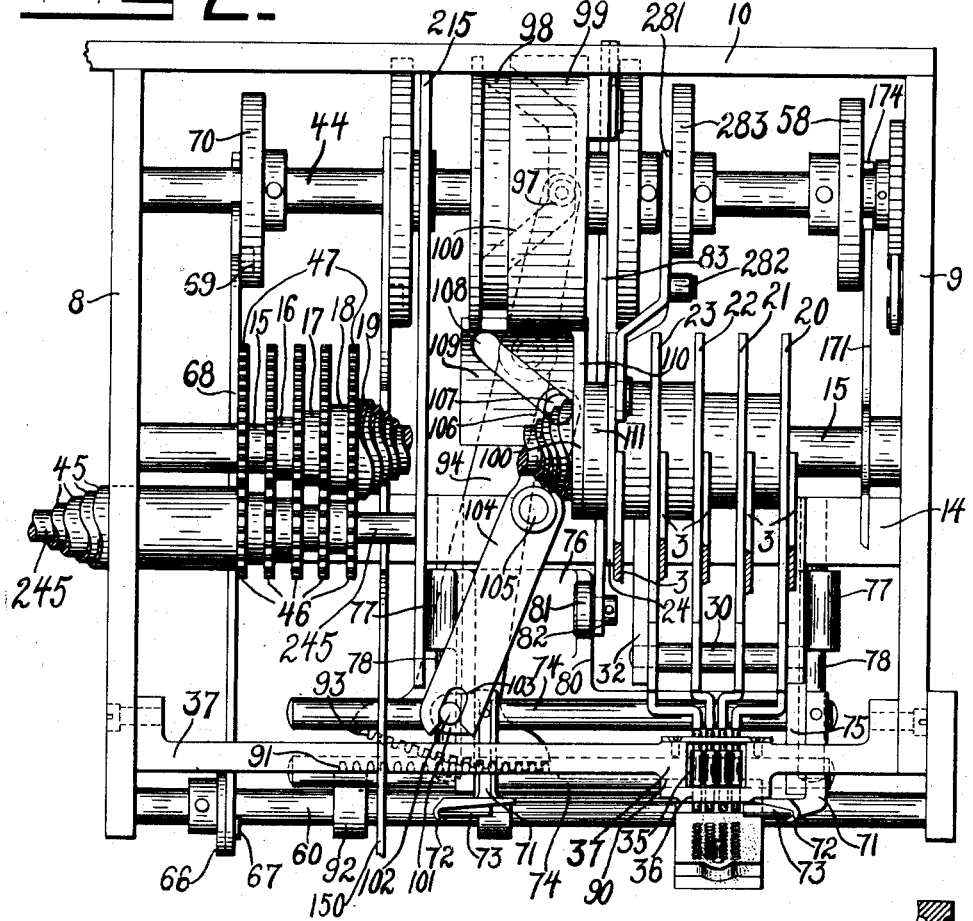
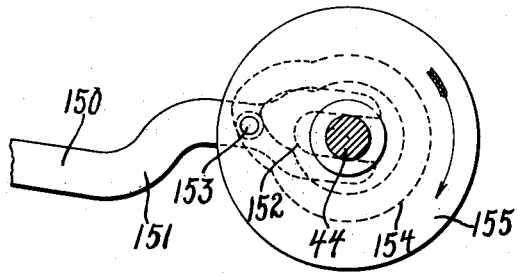
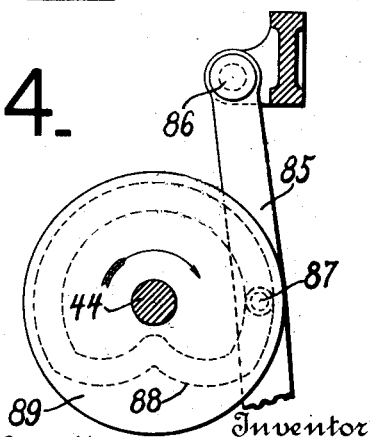

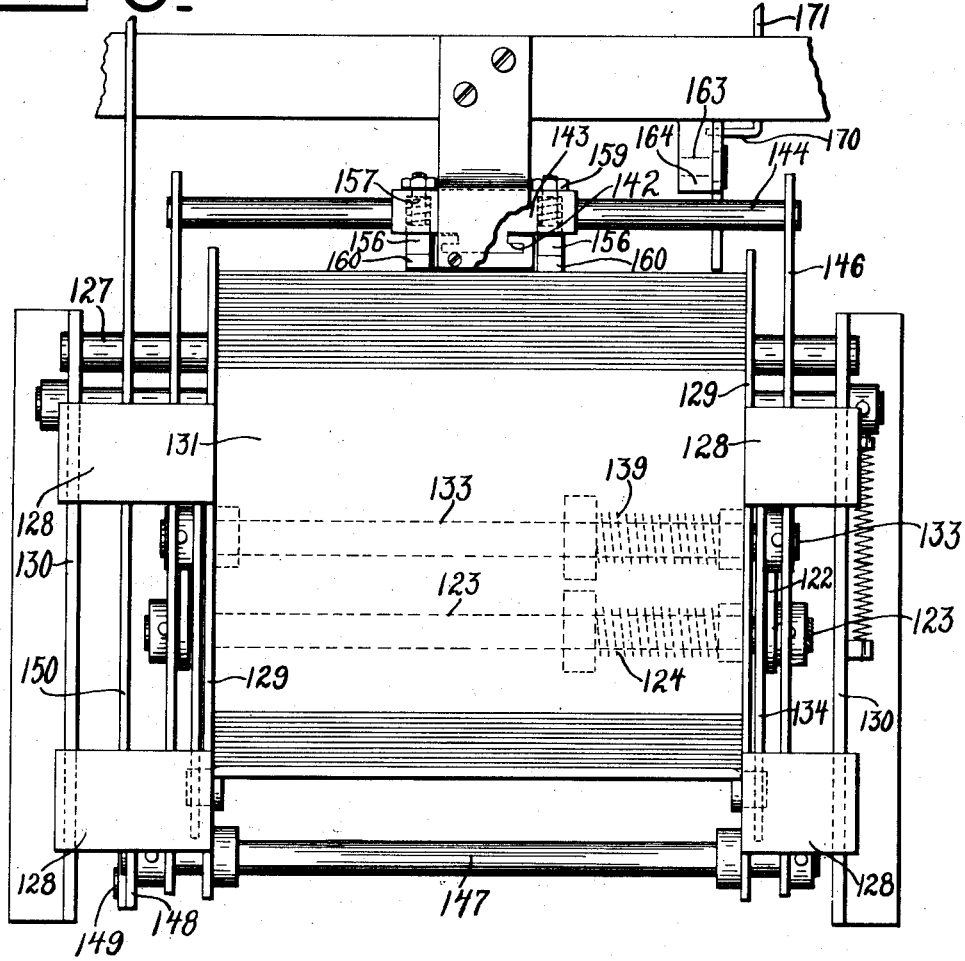
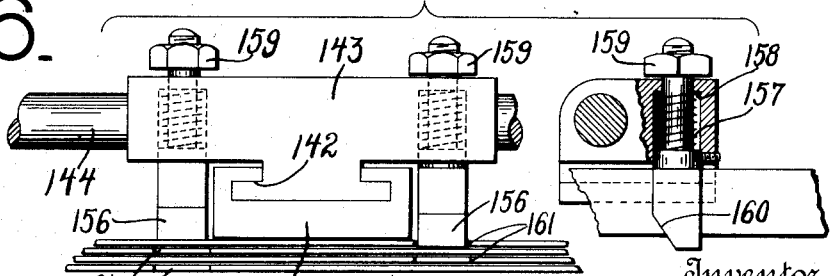

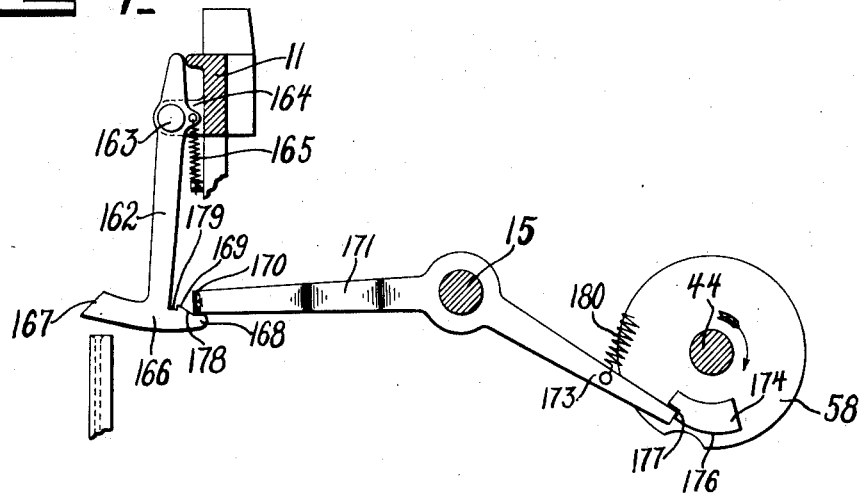

T. CARROLL AND J. C. LOCKYER.
PERFORATING MECHANISM FOR CASH REGISTERS.
APPLICATION FILED FEB. 5, 1915.
1,320,673.
Patented Nov. 4, 1919.
6 SHEETS—SHEET 5.
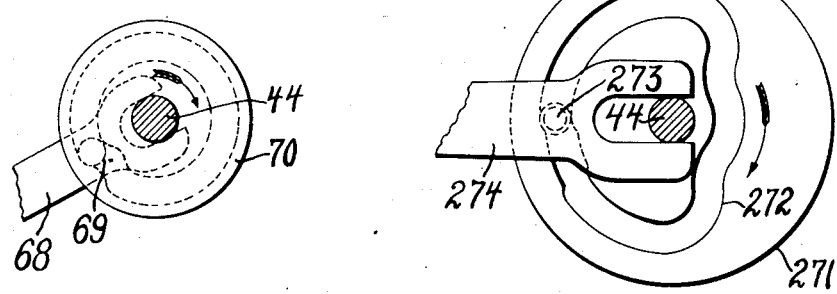
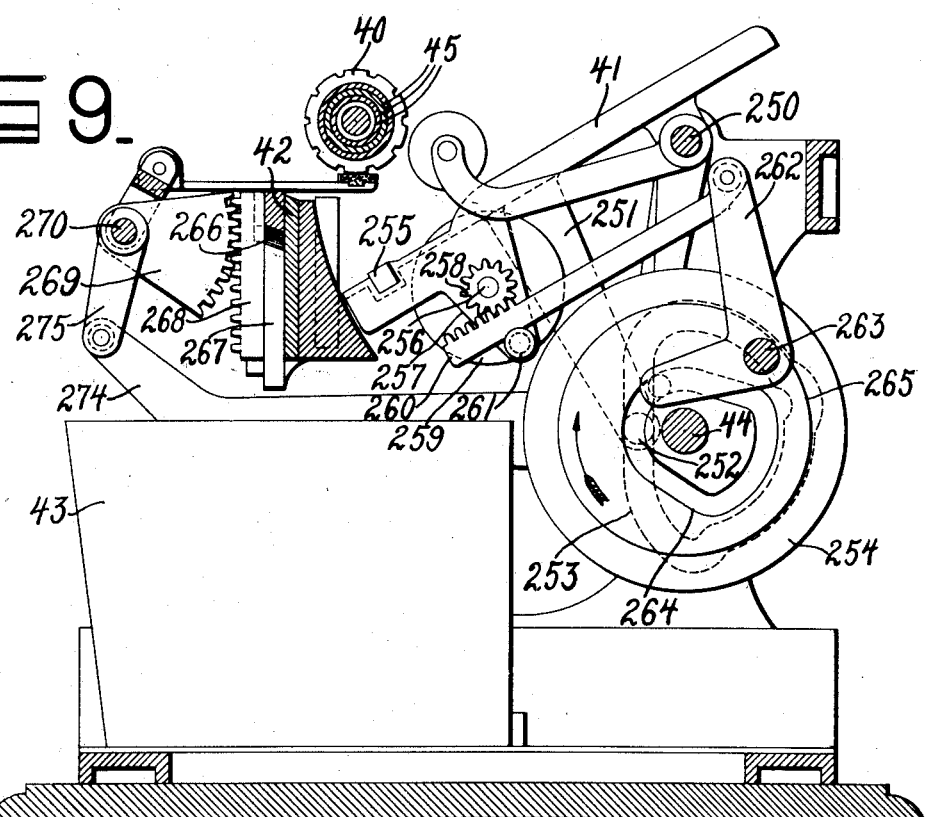

T. CARROLL AND J. C. LOCKYER.
PERFORATING MECHANISM FOR CASH REGISTERS.
APPLICATION FILED FEB. 5, 1915.
1,320,673.
Patented Nov. 4, 1919.
6 SHEETS—SHEET 6.
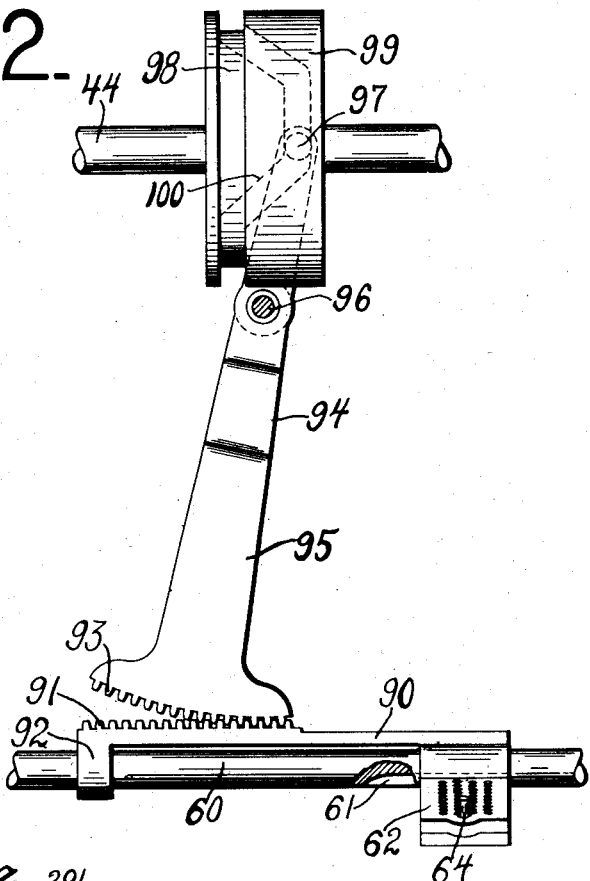
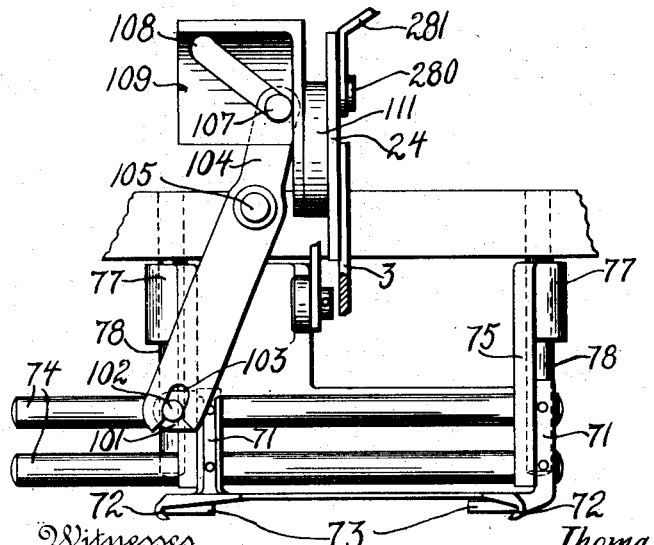
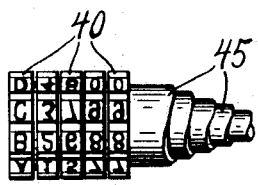
Witnesses
Carl N. Bogan.
J. B. Ricketts
Inventor
Thomas Carroll and John C. Lockyer
by R. C. Glass
Earl Beust
Attorneys

UNITED STATES PATENT OFFICE.

THOMAS CARROLL AND JOHN C. LOCKYER, OF DAYTON, OHIO, ASSIGNORS TO THE NATIONAL CASH REGISTER COMPANY, OF DAYTON, OHIO, A CORPORATION OF OHIO, (INCORPORATED IN 1906.)

PERFORATING MECHANISM FOR CASH-REGISTERS.

1,320,673.      Specification of Letters Patent.      Patented Nov. 4, 1919.

Application filed February 5, 1915. Serial No. 6,244.

*To all whom it may concern:*

Be it known that we, THOMAS CARROLL and JOHN C. LOCKYER, citizens of the United States, residing at Dayton, in the county of Montgomery and State of Ohio, have invented certain new and useful Improvements in Perforating Mechanism for Cash-Registers, of which we declare the following to be a full, clear, and exact description.

This invention relates to accounting machines such as cash registers, or machines performing some or all of the functions of such machines as are now common in the market, and the invention has to do mainly with the provision in connection with such machines, of a card feeding, punching, and storing mechanism, said punching mechanism being under the control of the accounting machine proper, in such a way that at each operation of the machine a card will be punched in a manner so as to be capable of controlling subsequent accounting operations of some accounting mechanism.

In accounting systems now well known the arrangement of punched holes in a card, determines amounts to be entered in accounting mechanisms in subsequent operations. By the provision of a plurality of punching fields of the card to be punched a classification of the items on the various cards may be had. In the form of the herein described invention, after a card is in position to be punched by operation of the accounting machine a relative adjustment between the card and its punching mechanism may take place, thereby to effect the punching of an amount controlled from the accounting machine, in the field of the card devoted to the class of items to which the amount for that operation of the machine, belongs.

Accounting machines are usually provided with manipulative devices through which amounts to be entered in the accounting mechanism are set up, and others through which the classification of the item in the machine is determined. The usual amount manipulative devices in this invention will control the ones of a number of punches which are to be the effective ones, for punching the set up number on the card. The usual special manipulative devices for classifying the amount will determine the relative adjustment between the punching mechanism and the cards to determine the classification of the particular amount, by having it punched in a desired one of a plurality of fields.

The invention is applicable, as indicated above, to various types of accounting machines. It is herein shown applied to a well known type of cash register such as shown and described in United States Letters Patent No. 934,994, granted September 28, 1909 on an invention of the present applicant, the present description showing only so much of the old machine as is necessary to make the present invention clear. In the machine illustrated in said Letters Patent, manipulative levers serve, by the position in which they are set for the operation of the machine, to determine the amount to be entered on registering mechanism and printed by printing mechanism upon the operation of the machine proper. In the present application no totalizing mechanism is shown or described as it forms no part of the present invention. It is obvious, however, that the form of totalizing mechanism shown in said Letters Patent or any other form may be employed without departing from the present invention.

As above indicated the invention includes a supply receptacle for cards and another receiving receptacle into which they are placed, after being punched, one at each operation of the machine.

It was an object of this invention to provide means for transferring a card, and only one at a time, from the supply receptacle to the punching mechanism, this being done near the end of an operation of the machine so as to have a card in place to be punched during the early part of the next operation of the machine.

It was, of course, a further object to provide an effective means for taking a punched card from the punching mechanism and properly storing it in the receiving receptacle, this latter transferring to be effected obviously, prior to the receipt by the punching mechanism, of a card from the supply receptacle in readiness for the next operation.

It was a particular object to design mechanism which will insure but one card being transferred from the supply receptacle to the punching mechanism at each operation, and novel means for performing this function in an exceedingly effective manner are shown. In connection with this card transferring mechanism it was an important object to efficiently provide for proper transfer of the punched card to the receiving receptacle, the latter properly retaining the card transferred, and permitting the transferring means to return to normal card receiving position.

The invention furthermore provides locking mechanism for the machine to prevent an operation of the machine when the cards in the supply receptacle have become exhausted and there is none present in the punching mechanism to be punched at the next operation.

In the embodiment shown a single set of punches under the control of the manipulative devices, is shown, the proper ones of the plurality of rows of punches to be rendered effective for any particular operation of the machine, under the control of the amount manipulative devices. This same set of punches is common to all the punching fields of the card and provision is made for shifting the means which directly holds the card when being punched, laterally of the punches to bring the proper field of the card in punching relationship with the punches. As the card to be punched at an operation is in this holding means at the end of the preceding operation of the machine, the holding means may be, and is, given the lateral adjustment relative to the punches, by the manual adjustment of that one of the manipulative devices of the machine, which serves to determine the classification of the item entered.

A part of the punching mechanism is, after the card is punched and ready to be transferred to the receiving receptacle, moved laterally to permit the otherwise obstructed holding means to carry the card to its receiving receptacle there leaving it and returning to normal position. After the holding means returns to normal position, the moved portion of the punching mechanism is returned to coöperative relationship with the remainder of the punching mechanism.

With these and incidental objects in view, the invention consists in certain novel features of construction and combinations of parts, the essential elements of which are set forth in the appended claims, and a preferred form of embodiment of which is hereinafter described with reference to the drawings which accompany and form part of this specification.

Of said drawings:

Figure 1 is a cross section of the machine on a line just inside the right hand frame and looking to the left.

Fig. 2 is a top plan view of a part of the machine showing the amount and special manipulative devices, differential mechanism, punching mechanism, and the driving shaft and controlling cams of the machine.

Fig. 3 shows the cam and its operated link used for operating the means for singly transferring cards from the supply receptacle to the punching mechanism.

Fig. 4 shows the cam and its operated lever, used for operating the means for transferring a punched card from the punching mechanism to the card receiving receptacle.

Fig. 5 is a top plan view of the front part of the machine showing the appearance of the card supply and receiving receptacles and associated elements.

Fig. 6 is a detail view of the means for singly transferring cards from the supply receptacle to the punching means.

Fig. 7 shows the machine locking mechanism which locks the machine against operation if there is no card in position to be punched.

Fig. 8 is a view of the card to be used in the machine, showing an amount punched in the field for the department D of the card, the card being inverted from the position in which it is handled by the machine.

Fig. 9 shows a form of printing mechanism suitable to the machine for printing amounts as well as their classification, this being identical with Fig. 4 of the above mentioned patent.

Fig. 10 shows the cam and operated link for operating the severing mechanism which severs, in the machine of the patent, a portion of the slip printed upon.

Fig. 11 is a detail view of the cam and its associated pitman for rocking the die frame to effect the punching.

Fig. 12 is a detail assembly view of the die shifting mechanism.

Fig. 13 is a detail assembly view of the card holding frame and its shifting mechanism.

Fig. 14 is a detail view of the printing type wheels including four number or amount printing wheels and one clerk's or department printing wheel.

In the drawings, 1 is the cabinet which substantially incloses the various mechanisms of the machine though provided with forwardly and backwardly extending slots, at the top in Fig. 1, through which extend the free ends of manipulative levers 3. In this figure is also shown an upwardly and forwardly swinging door 4, at the front of the top of the cabinet pivoted at 5 to the front side of the main cabinet 1. This door permits access to the front of the machine from the top for such purposes as desired such as supplying the machine with cards to be punched. There is also near the bottom at the front of the machine a removable closure 6, permitting access to the receiving receptacle for punched cards, removable and attachable in any well known manner. The cabinet 1 is provided adjacent and alongside slots 2, with index plates 7 for the purpose of aiding in the adjustment of the levers 3. The index plates are not shown in detail herein as they form no part of the present invention but are clearly and fully shown in the aforesaid patent. A conventional form of printing mechanism is shown in Fig. 9 and this is mounted outside the left end of the cabinet, telescoping sleeves being shown at the left in Fig. 2, broken off, but serving in the usual way to set up the printing type of the printing mechanism.

The framework for the machine proper includes, at the front part of the machine associated with the mechanism shown in Fig. 2, right and left end frames 8 and 9 respectively connected at the top by cross beams 10 and 11, and cross beams 12 and 13 at the bottom of the machine. A little higher up and between the beams 12 and 13 but closer to the latter, there also extends between the end frames 8 and 9 still another cross beam 14. Between the end frames 8 and 9 there is also an intermediate forwardly and backwardly extending frame 215 supported by the beams 10, 12 and 14 and shown by broken lines in Fig. 1.

The main driving shaft 44 of the machine has end bearings in the end frames 8 and 9 and extends through the intermediate frame 215. This shaft is adapted to be given one complete rotation at each operation by any suitable means such as a crank handle or motor, both of which are well known in the art and need not be described in detail. It carries practically all the main operating cams of the machine by which the various operating mechanisms are operated properly. A shaft 15 is loosely journaled at its right end in a bearing in the end frame 9, and supported at the left by the frame 8. (Fig. 2). Surrounding the shaft 15 are four sleeves, 16, 17, 18 and 19, the sleeves as well as the shaft carrying them being broken away near the middle in Fig. 2 to give a better view of the mechanism below them. The shaft 15 and the sleeves 16, 17, 18 and 19, respectively, rigidly carry controlling segments 20, 21, 22, 23 and 24 (only segment 20 being shown in Fig. 1) to the left side of each of which is pinned the lower end of the corresponding one of the corresponding number of the manipulative controlling levers 3 shown in Fig. 1, the upper ends of all of which are broken off in Fig. 2.

Segments 20, 21, 22 and 23 are each provided on their forward edges with gear teeth 25 (Fig. 1) coöperating with teeth 26 formed on the rear edges of vertically slidable rack bars 27, the upper ends of which work in and are guided by, notches 28 in the depending projection 29 of the cross beam 11. The lower ends of these racks 27 are guided for vertical movement by rod 30, passing through slots 31 in the lower end of the racks, and carried at its ends by arms 32 projecting upwardly and forwardly from the cross beam 14. As in the hereinbefore mentioned Letters Patent the levers 3 are adapted to be given an adjustment as a preliminary to an operation of the main operating mechanism to determine the amount to be recorded. The adjustment of any of the levers 3 from the normal position shown in Fig. 1 will rock the appropriate ones of the segments 20 to 23 inclusive, in a clockwise direction relative to the shaft 15, thereby elevating the appropriate rack bars. The racks 27 are separated transversely in correspondence with the separation of the segments 20, 21, 22 and 23, and have forwardly extending projections 33, which will determine or control the punching of the card by the punching mechanism, hereinafter more fully described. In general it may here be said, that each of these projections 33 controls the punching of the card for the denomination to which it belongs, by reason of it engaging when the appropriate manipulative lever 3 is set with the rear end of the appropriate one of a corresponding denominational vertical row of ten plunger punches 34.

There are four rows of these punches 34, but from Fig. 2 it will be seen that these rows are closer together than are the racks 27, this being advisable so that the punching fields in the card may be no larger than necessary. It is, of course, obvious that the projections 33 of the racks 27 will be separated only in correspondence with the separation of the rows of punches 34. This is taken care of by off-setting the projections 33 of the racks 27 as shown in Fig. 2, the two outer racks being off-set the most but in opposite directions and toward each other, and the inner ones a less amount but also toward each other. In this way the four projections 33 of the four racks 27 are brought closer together than are the racks themselves, so that the projections will be in alinement with their respective row of punches 34.

All of the punches 34 are enlarged intermediate their ends at 35, and are supported and guided at their rear ends in openings in the forward wall 36 of a punch holding frame forming part of a cross beam 37 of the machine. The rear end of the punches work in openings in a plate 39 removably secured to the main body of the punch frame and forming the rear wall of it. The punches are only effective when in their forward positions into which position they are moved whenever their appropriate projection 33 engages and remains adjacent their rear ends thus holding them forward when the actual punching operation takes place. Thus but one punch in a row will be seen to be effective to punch a hole in the card at an operation, all other punches in the row being free to be pushed back when the card to be punched is forced against their forward ends, only the one backed by the projection 33 being held firm so as to act as a punch in its row for that particular operation.

When the levers 3 are in their zero position the rack bars 27 with their projections 33 are in their lowermost position shown in Fig. 1, and if one of them is left in that position by reason of no adjustment being given to its manipulative lever 3 a hole will be punched in the card at a place to indicate zero for that denomination. When a manipulative lever 3 is, however, moved to bring it to some position relative to the index plate 7, indicating other than zero, its rack and projection 33 will form a backing to hold the appropriate punch of the vertical row corresponding to the adjustment of the manipulative lever 3 so that when the machine is operated the particular punching for that row of punches will accord with the adjustment of such lever 3.

In the foregoing it has been described how the desired punches of the different rows are to be rendered effective in an operation of the machine under the control of corresponding manipulative levers 3. These same levers and segments, it will be obvious to those skilled in the art, may well serve also to control the setting up of printing mechanism correspondingly to print the amount punched when the machine is operated. This differential mechanism may also perform the other usual functions of a register of the type shown in said patent. In Fig. 9 a printing mechanism has been shown suitable for printing and severing checks when the machine is operated. This is substantially the same as the printing mechanism of the Letters Patent above referred to, to which reference is made for a detailed description of this printing mechanism and its operation. It will suffice here to say that in Figs. 9 and 14, 40 represents the type wheels against which a check is carried by the table 41 to be printed upon by the machine twice. As will be seen by reference to Fig 14, there are five type wheels 40 corresponding to the number of levers 3, four of said wheels 40 being appropriate to the four amount levers and the fifth or left hand wheel being appropriate to the left hand lever 3 which designates the clerk or department. It is customary in machines of the type shown in the aforesaid patent to print in duplicate upon an inserted slip and then to sever a voucher from the main slip and deposit the voucher in a locked compartment of the machine, the line of severing being between the duplicate impressions so that one impression will be on the voucher and the other on the main portion of the slip.

The operation of printing and severing the slip is effected in the following manner: The slip when inserted is placed on the platen table 41 (Fig. 9) journaled on a shaft 250 and provided with a rigid pendent 251, which pendent carries at its lower end an anti-friction roller 252. The roller 252 projects into the groove 253 of a box cam 254 fast on the main operating shaft 44. The platen 255 is located near the lower end of the table 41 so that when the latter is raised, the platen 255 will force the check against the type 40. A shaft 256 is journaled in lugs 257 pendent from the table 41 and carries a pinion 258 and two feeding rollers 259, the latter projecting through the table 41. The pinion 258 meshes with a rack bar 260 held in relation therewith by a roller 261 on the right hand pendent 257. The bar 260 is pivotally connected to a bell crank lever 262, pivoted at 263 and having an anti-friction roller projecting into the groove 264 of a box cam 265 fast to the shaft 44.

The purpose and formation of the cam 254 is to force the platen 255 against the type 40 twice so as to take two successive impressions therefrom and the purpose and formation of the cam 265 is to actuate the rollers 259 so as to feed the inserted slip between the two impression movements of the table 41 so as to cause the two impressions to be made at separate points on the slip.

The feeding of the slip is to an extent sufficient to cause the first printed impression to pass beyond the stationary cutting edge 42 and beneath the movable cutting edge 266 which is at that time elevated. The cutter 266 is carried by a reciprocating frame 267 having a rack bar 268 meshing with the teeth of a rack segment 269 rigidly mounted on a rock shaft 270. The shaft 270 is rocked by a cam 271 (Fig. 10) through the medium of a cam slot 272 formed therein, an anti-friction roller 273, pitman 274 and arm 275 fast on the shaft 270. The cam groove 272 is so formed that the movable cutter 266 will be elevated before the feeding action of rollers 259 and then lowered immediately after the feeding has been completed. The lowering of the cutter will then act to sever the voucher bearing the first impression, which voucher will then drop into a receptacle 43 locked within the casing of the machine.

The type wheels 40 are carried by four telescopic sleeves 45 and a shaft 245 all of which are set by the adjustment of the manipulative levers 3 as shown in Fig. 2, the shaft 245 being supported by the left hand frame not shown and the sub-frame 215 hereinbefore mentioned. The right hand ends of the telescopic sleeves 45 and shaft 245 carry pinions 46 meshing with pinions 47, carried by the ends of the shaft 15 and sleeves 16, 17, 18 and 19, above described as carrying the controlling segments 20, 21, 22, 23 and 24, the latter segment 24 acting in a manner hereinafter described, to select the one of a number of fields the card is to be punched in, thus to classify the punchings of the various cards into a number of classes. This segment 24, of course, will serve as regards its control over the printing mechanism, to print a character corresponding to the class to which the item printed belongs, or perform other functions without departing from the spirit of the invention.

It is necessary for purposes hereinafter set forth to restore to normal the lever 3, assigned to the department selections, prior to the end of each operation of the machine together with all its associated parts. This restoration to normal position of the department lever is effected in the following manner: Pivotally mounted at 280 to the gear segment 24 of the department lever 3 is a pitman 281, the rear end of which is bifurcated to straddle the shaft 44. Near its bifurcation the pitman carries a roller 282 adapted to coöperate with a peripheral cam 283 fast on the shaft 44. The cam 283 when in the normal position shown in Fig. 1, permits free movement of department lever 3 and pitman 281, by reason of the cut away portion of the cam being adjacent the roller 282. It will be seen from the contour of the cam 283 that when the said cam has moved nearly 180° in the direction of the arrow the face 285 of the cam will engage roller 282 and force the pitman 281 upwardly and forwardly thereby restoring the gear segment 24, department lever 3 and their associated parts to normal position.

For the purpose of temporarily locking the levers 3 in their positions of adjustment there have been provided as shown in Fig. 1, alining pawls 48, supported on a rod 49, carried by standards 50, projecting upward from a short cross beam 51 rigid with the frame. The pawls 48 are spring pressed normally with their noses 52 in engagement with the alining teeth 53 formed in a plate 353 fast on the sides of the segments, their springs 354 yielding to permit manual adjustment of the levers 3 before the shaft 44 starts to rotate. A swinging frame 54 has set screws 55 backing the tails 56 of the alining pawls 48, and this frame has a roller 57 coöperating with a disk 58 carried by the drive shaft 44. The roller 57 normally is opposite a notch 59 in the disk, which notch will allow the frame to swing slightly counter-clockwise by adjustment of the levers 3. This counter clockwise movement of the pawls 48, by the engagement of their tails with the set screws 55, will swing the frame 54 to carry the roller 57 in the notch 59 of the disk 58. However, after the shaft 44 has begun rotation, the periphery of the disk away from the groove will engage the roller 57, forcing the frame 54, and through its set screws 55, the alining pawls 48, firmly in engagement with the teeth 53 of the segments to aline the latter and hold them alined until the end of the operation, when the roller 57 will again be opposite the notch 59 in the disk 58, and the manipulative levers 3 may be adjusted for the next operation. This construction is, however, similar to that of the patent.

Referring more in detail to the punching mechanism, it will be seen that just below the rear edge of the punch holding frame 36 there is journaled in the frame of the machine a shaft 60 capable of being rocked in its bearings. (See Figs. 1, 2 and 12). Splined at 61 to this shaft and carried by the same is a die frame 62 having openings 63 of number and arrangement corresponding to the punches in the punch holding frame 36. The upper end of this die frame is guided by a pilot pin 64 coöperating with a pilot pin opening 65 in the upper end of the punch holding frame. The shaft 60 has fast on its left hand end an arm 66 pivotally connected at 67 with one end of a pitman 68, the other end of which is bifurcated to straddle the drive shaft 44 and is provided with a roller 69 projecting into a cam groove in the side of box cam 70 fast on the drive shaft 44. The configuration of the cam groove in the disk 70 effects a rocking of the shaft 60, and likewise of the die frame 62, to carry the latter against the punches 34 carried by the punch holding frame.

The movement of the die frame 62 takes place with a true proper alinement between the die openings 63, and the punches 34 by reason of a pilot pin 64 carried by the die frame, at such time being guided by a pilot opening 65 in the punch holding frame. The die frame 62, though splined to the shaft 60, can be shifted laterally on the same and is so shifted by mechanism and for a purpose hereinafter described. This is not done in a direct punching operation however, but only to provide a clear path for the punched card to be moved to the receiving receptacle as will subsequently appear.

A card holding frame is provided for holding a card to be punched adjacent the punch holding frame and the cutting ends of the punches, so that when the die frame 62 is rocked, it will engage the back of the card and force the latter against the cutting ends of punches that are held in their moved positions by the projections 33. All punches displaced by the adjustment of the levers 3, and which are not held by the projections 33, will simply be forced back to normal position, so that by reason of the die opening 63 being in alinement with the punches 34 those punches which are firmly held rearward by the projections 33 upon the racks 27 will be effective as punches and punch openings in the card through the coöperation of these punches with their die openings at such time alined with them at the back of the card. All punches that are in their forward position, as well as those rearmost but not backed by projections 33 on the racks 27, will not act in coöperation with their die openings to punch holes in the card. This explains the forward and backward swinging function of the die frame 62 and the manner of punching of a card.

The card holder which holds the card between the punch frame and the die frame comprises two vertically extending side pieces 71 (Figs. 1, 2 and 13) each having a vertical V-shaped groove 72 and a portion 73 upon which the card rests at its corresponding lower corner, the vertical grooves or guide ways for the card 72 of the two vertically extending side pieces 71 being opposed to co-act with the vertical edges of the card when the latter is in position in the card holding frame. It will be also noted that the rear walls of the V-shaped grooves are wider than the front walls. The two vertically extending side pieces 71 of this card frame are connected, and rigidly carried, by two transverse rods 74 which pass through end portions 75 of a frame 76. The end portions 75 are rigidly connected by a base plate 80 (Fig. 2) and each has a depending projection 77 at its rear, each being provided with an opening through the medium of which the frame is slidably supported for front and back movement, on fixed rods 78 passing through the openings. The rods 78 are rigidly carried by and project from depending arms 79, carried by the cross beam 14. The base plate (Fig. 2) of this frame 76 has near its center an upstanding ear 81 by which, through pin 82, it is connected with the forward end of a link 83 pivotally connected at 84 to its opposite end to the lower end of lever 85 (Figs. 1 and 4) pivotally supported at its upper end at 86 by the cross beam 10. The lever 85 carries intermediate its ends, a roller 87 playing in a cam groove 82 in a box cam 89 carried by driving shaft 44. By reference to Fig. 4, which shows the configuration of this cam groove, it will be seen that during the last half of rotation of the drive shaft 44 the lever 85 will be swung to its extreme forward position and back to normal position where it remains throughout the remainder and during the first half of the rotation of the driving shaft. This swinging of the link 85 results in the backward and forward movement of the link 83 which being connected at 77 to the frame 76 slides the latter on its guide rods 78.

Owing to the fact that the card holding frame is connected with the frame 76 by reason of its transverse shafts 74 extending through openings in the end portion 75 of the frame 76, the card holding frame will be carried forward and then backward to normal position by the corresponding movement given the frame 76 by the cam 89 and its connections. The normal position of all these parts is such that the card holding frame holds the card in position to be punched when the die carrying frame 62 is brought up forcibly against the back of the card.

The die carrying frame 62 is swung forward at the very first to punch the card through its link connection 68 with the cam 70 and returned. After the card has been punched and the die carrying frame 62 is swung to normal position it will be seen that the frame is in the way of the forward movement (to the left in Fig. 1) of the card carrying frame just described. Means have been provided for laterally shifting the die carrying frame 62 to the right (Fig. 2) out of the path of the card carrying frame, this being done after the card is punched but before the rearward movement of the card carrying frame begins. It will be seen that the splined connection 61, between the die carrying frame 62 and the shaft 60 (Fig. 1) permits this lateral shift of the die carrying frame at this time. It is effected by extending from that portion of the die carrying frame 62 surrounding the shaft 60, toward the right side of the machine, a plate 90 (Figs. 1 and 2) carrying on its front side, rack teeth 91, and having a bearing collar 92 at its right end slidably mounted on the shaft 60. Thus this collar 92 and rack plate 90 are in reality a part of the die carrying frame 62, swinging with it and the shaft 60 and sliding laterally on the shaft. The teeth 91 on this plate 90 mesh with teeth 93 segmentally arranged on the forward end of a lever 94 bent upwardly at 95, and pivotally carried at 96 on the under side of cross-beam 51. The rear end of this lever 94 carries a roller 97 working in a peripheral groove 98 in cam 99 carried by the drive shaft 44, said roller 97 coöperating with said cam 99 on the under side of the latter. From the showing in Figs. 2, 11 and 12, it will be seen that through this connection just described, the die carrying frame 62 will be shifted to the right of the machine on the shaft 60 during the first quarter rotation of the drive shaft, but that this will not begin until after the cam 70 has operated to rock the die carrying frame to punch the card and return to its normal position after which it is immediately shifted to the right of the machine and held there until near the end of the rotation of shaft 44 or long enough to give ample time for the card holding frame to be shifted laterally to normal position and then to carry the punched card forward and deposit it in the receiving receptacle as hereinafter described, and then return to normal position to receive another card. The die carrying frame 62 is then, near the end of rotation of the drive shaft 44, shifted back toward the left of the machine to its normal effective position by the inclined portion 100 of the cam groove 98 in the cam 99.

As above indicated means are provided for classifying the various amounts in the machine by having a plurality of punching fields on the card to be punched, and adjusting the card holding frame with its card laterally of the punch and die frames, this adjustment being given directly by the operator when adjusting the special department lever 3 which determines the classification of the items handled by the machine. There is shown in Fig. 8 a card of preferred form for use in the present machine. It will be noted that it is provided with but four punching fields for four departments but it is obvious that additional fields for additional departments may be provided without departing from the spirit of the invention.

In order to accomplish the desired classification, the base of the left hand vertical end piece 71 (Figs. 1, 2 and 13) is provided with a lateral ear 101 extending above the forward cross-rod 74 of the card holding frame. This ear is provided with an upwardly extending pin 102 working in a notch 103 in the forward end of a lever 104 pivoted at 105 on top of the cross beam 14. The elevated rear end 106 of this lever 104 is provided with an upwardly extending roller 107 working in a slot 108 of an arcuate cam 109 projecting laterally toward the left from plate 110, pinned to the right hand side of collar 111 fast to the actuating plate or segment 24 which supports the department lever 3. Thus it will be seen that by adjusting this department lever 3, which is thus rigid with collar 111 and with plate 110 and arcuate cam 109, the lever 104 will, due to the shape of cam slot 108 in the cam 109, be swung about its pivot 105, thus effecting, through the pin and notch connection 102 and 103 with the card holding frame, lateral adjustment of the card holding frame relative to the punch and die carrying frames. This adjustment provides for placing, at will, any of the punching fields of the card in coöperative relationship with the punching mechanism, for classification of the items being punched.

The department lever 3, which adjusts the above described mechanism, is returned to normal position by mechanism of the machine hereinbefore described, after the card is punched but before it is transferred to the receiving receptacle, and this is done during the time that the die carrying frame 62 is being moved to the left, as above described, to clear the way for the forward movement of the card holding frame made use of to place the punched card in the receiving receptacle. It will be seen that the card holding frame, by reason of its rods 74 being slidably supported in openings in the end pieces 75 of the frame 76, can be given this lateral adjustment without any lateral movement of the reciprocating movable frame 76 being necessary, though when this latter frame is reciprocated, the card holding frame must, of necessity, move with it.

The reciprocating movement of the frame 76 and card holding frame is for the purpose of storing the punched cards in a receiving receptacle 112 located directly back of the position in which the card holding frame normally rests and immediately below the card supply receptacle.

This receiving receptacle (Fig. 1) is composed of side walls and a front wall 114, and a bottom 115. The whole receptacle is removable from the cabinet of the machine through the opening 116 in the same, closed by the closure 6, the receptacle resting on opposite ledges 117, carried by the machine frame, when said receptacle is in position in the machine. The receptacle 112 has within it a plate 118 of similar cross section to the interior of the receptacle, and this plate, by reason of having on its opposite edges outwardly extending rollers or pins 119, working in slots 120 in the two side walls of the receptacle, and in slots 121 in the free end of arms 122 carried on the opposite ends of a rock shaft 123 held yieldingly against clockwise movement by spring 124 (Fig. 5) surrounding the shaft, is normally and yielding held toward the rear end of the receptacle.

The plate 118 is prevented from being carried clear out of the front of the receptacle by reason of engagement with projections 125 in its path, which projections are carried by spring controlled pawls 126 adjacent the four corners of the plate, and held by stop pieces 127 from excessive movement in one direction to permit the plate 118 being completely removed from the receptacle. While these pawls 126 are thus limited in one direction of movement, they can swing against the tension of their springs, in the other direction. If there are no cards in the receiving receptacle the plate 118 will be held forward against the projections 125 of the pawls 126, but if there are punched cards in the receptacle they will occupy space between the front of plate 118 and these projections 125, the plate 118 receding farther from these projections 125 of the pawls, as more cards are stored in front of it. The plate 118 recedes against the tension of the spring 124 on the shaft 123 exerted on the plate by means of the arms 122 on the ends of the shaft 123 and the pin and slot connection between the free ends of these arms and the edges of the plate. While the plate 118 is normally yieldingly held forwardly of its receptacle, it will be seen that punched cards may be, one at each operation of the machine, stored in the receiving receptacle in front of the plate 118. The reciprocating movement of the card holding frame, which movement is given through the reciprocation of frame 76, operated through links 83 and 85 by cam 89, is given for this purpose.

It will be remembered the forward movement of the card holding frame takes place after the die carrying frame 62 is moved to the left on its shaft to clear the way for the otherwise obstructed forward movement of the card holding frame. Merely by its lower corners resting on ledges 73, and by being guided on its opposite vertical edges by the opposing guides 72, it will be seen that the card will be carried by the forward movement of its holding frame, to carry its upper and lower edges against the forward side of the projections 125 of the pawls 126. The walls of the receptacle are sufficiently far apart to admit the guides 72. Continued movement of the card rearward impelled by its frame will cause the pawls 126 to be swung about their pivots to allow the upper and lower edges of the card to pass beyond the projections 125 of the pawls 126, which thus will, automatically under the influence of their springs, return to normal position locating their projections 125 back of the corners of the card which is then in position above floor 115 of the receiving receptacle. The card holding frame is then moved backwardly to normal position, but owing to the projections 125 of the pawls 126 being now back of the punched card, the latter will not return with the card holding frame, but owing to its flexibility and its being held by the projections 125 will have its edges carried out of the opposing grooves 72 of the vertical end pieces of the card holding frame by reason of the front walls of said grooves being very narrow, and simultaneously the ledges 73 of the card holding frame will pass forwardly from beneath the lower edge of the punched card. Thus the card, now freed from the card holding frame which supported it when being punched, will rest beyond the projections 125 of the pawls 126, on the floor 115 of the receiving receptacle in the rear of any cards which have been previously stored in this receptacle. At the next operation of the machine the card next punched will take its place in the rear of the card, the storing operation of which, has just been described. After the card holding frame returns forward to normal position the die carrying frame 62 is moved back to the right to normal position and a new card is placed in the card holding means in readiness to be punched near the beginning of the next operation of the machine. This placing of a new card in proper position in the card holding frame will now be explained.

Located above the receiving receptacle 112, supported and held from forward and backward movement by rod 127 and further supported by flanges 128 (Fig. 5) projecting outwardly from its two side walls 129 and resting on the top of side portions 130 of the rear frame work of the machine, is the card supply receptacle 131, from which cards are fed, one by one, at each operation of the machine to the card holding frame above described. The side walls of this card supply receptacle have depending ears 132 (Figs. 1 and 5) which support the ends of a rock shaft 133 similar to the shaft 123 above described, but carried by the receiving receptacle. This shaft 133 is provided at its ends with arms 134 having slots 135 in their free ends in which play rollers 136 carried by the two vertical edges of a backing plate 137 within the receptacle, said rollers also extending through slots 138 in the side walls 129 of the receptacle. This supply receptacle is, of course, provided with a floor as was the receiving receptacle, and a spring 139 (Fig. 5) surrounds the shaft 133 and is so connected with it as to tend to rock the shaft in a clockwise direction and to yieldingly move the backing plate 137 rearwardly in the receptacle, it occupying the extreme position toward the rear if there are no cards in the receptacle, but being located farther front in the receptacle just behind any cards stored in the receptacle. The cards in the supply receptacle in front of the backing plate 137 are confined in the receptacle and prevented from removal from the front end of the same, except as provided one at a time at each operation of the machine, by plate 140 extending vertically across the front end of the receptacle and supported by a bracket 141 mounted on beam 11, and slightly within the ends of the side walls as shown in Fig. 1.

The cards in the supply receptacle are yieldingly forced forward against the plate 140 by the backing plate 137 for the cards. The cards, of course, stand vertically in this supply receptacle as in the receiving receptacle, and there is just enough space between the rear edge of the floor of the recptacle and the front face of the plate 140 to allow one card to pass down between this edge of the floor and the bottom of the plate 140. Except as impelled by special means the front card will not drop down through this space for the spring controlled backing plate 137 in the card receptacle, firmly though yieldingly, squeezes the cards between it and the front side of plate 140, the cards being held between these pieces so firmly that the rear card will be held frictionally from dropping down through the space between the lower end of plate 140 and the rear edge of the floor of the receptacle. The cards will be so held in this manner in the receptacle regardless of the number in the supply receptacle owing to the yieldingly acting backing plate 137. If the receptacle is full of cards the plate 137 will be in the position shown in Fig. 1 and as the cards are transferred from it it will gradually approach the rear of the receptacle engaging the plate 140 direct when there are no cards in the receptacle.

It is obvious how the receptacle may be filled with cards by merely manually forcing the plate 137 to the front of the receptacle and placing the cards vertically in front of it.

The card holding frame, which holds the card when being punched in the manner above described, normally stands precisely below the front edge of the card supply receptacle and in position to have the foremost card carried from the latter vertically downward in the opposing grooves 72 of the card frame until the bottom corners of the card rest upon the ledges 73 of said frame.

A novel and very effective means for positively transferring the foremost card in the receiving receptacle down vertically into position in the card holding frame is provided. A guide-way 142 is provided in the rear side of the plate 140, serving to guide a vertically reciprocating head 143 (Figs. 1, 5 and 6) which has passing through it and projecting from it at opposite sides a shaft 144, the ends of which work in notches 145 in the rear ends of arms 146 rigidly carried outside the walls of the card supply receptacle, by the ends of a shaft 147 journaled in the walls of the receptacle. The extreme left end of this shaft 147 carries an arm 148 pivotally connected at 149 to one end of a link 150 curved down at 151 to pass beneath transverse shaft 15 and having at its extreme rear end a notch 152 straddling the drive shaft 44. (Fig. 3). A roller 153 projects from one side of the rear end of this link and plays in a cam groove 154 of a box cam 155. The configuration of this cam groove is such, as is shown in Fig. 3, as to operate the chain of mechanism just described, at the beginning of the operation of the machine to raise the free ends of arms 146 and therethrough the vertical sliding head 143, holding the head raised until near the end of the operation of the machine when it is quickly lowered to the position shown in Fig. 1, carrying with it downward the rearmost card in the supply receptacle, and placing the same in the card holding frame in readiness to be punched at the next operation of the machine.

The vertical sliding head 143 carries two plungers 156 projecting forwardly of the head, one on each side of the vertical face of plate 140, the rear ends of these plungers being reduced (Fig. 6) to confine springs 157 between their larger parts, and the rear of openings 158 in the sliding head, the reduced ends of the plungers project through the sliding head and are provided with nuts 159 serving to prevent withdrawal of the plungers. The forward ends of the plungers have their upper edges beveled at 160. The sliding head and plungers normally occupy the position shown in Fig. 1, in which they are below the lower edges of the cards in the supply receptacle. When the plunger head is raised at the proper time, as above described, the beveled edges 160 of the plungers serve by engagement with the lower edges of the rearmost card, to cam the plungers toward the rear of the machine against the tension of their springs. As soon as this cam action on the plungers takes place the forward ends of the plungers will be in engagement with the rear side of the rearmost card, and will be carried up along the face of this card by the raising of the plunger carrying head. The plungers are not beveled on their lower rear edges, so that when the sliding head carries the plungers sufficiently upward to their extreme upper position, one of them is effective as will soon be described, to engage over the upper edge of the rearmost card so that when the head and plungers are carried down to their normal position one of the plungers will positively move the rearmost card in the supply receptacle down to position it in proper place in the card holding means.

To guard against any possibility of two cards being carried down simultaneously by the plungers to the card holding frame, the upper edges of the cards are notched in a novel manner, that is, the edges which are up when the cards are properly in the supply receptacle. It will be noted that the cards are properly handled by the machine inverted as regards the printing on the card, and Fig. 8 shows a notch 161 in the edge of the card that will be uppermost when in the machine. It will be observed that this notch is just of the width, or a little more, of one of the plungers described, and it will also be observed that it is slightly at one side so that when the card is in the card supply receptacle, it will be in alinement with one of the feeding plungers. The card which is to be placed in the supply receptacle adjacent to this one will have its notch 161, a corresponding distance to the other side of the center in alinement with the other feeding plunger. When the plunger head is raised it is not raised sufficiently to carry the plungers up so that they will clear the extreme upper edges of the cards, but only sufficiently high so that the plunger which is in alinement with the notch in the foremost card will merely engage over the upper edge of the card in the notch so as to produce feeding effect on the card when the plungers move down. However, when the two plungers move down, the one that it is engaging in the notch in the foremost card will positively force the card down, carrying it into position in the card holding frame beneath it. At the next operation of the machine the plunger ineffective at the preceding operation, will be effective while the one effective at the preceding operation will be ineffective. Thus the plungers alternate in effectiveness in successive operations of the machine and as the cards are to be so arranged in the card supply receptacle that no two adjacent cards in the supply receptacle have alined notches 161, it will be impossible in any operation, for either one or both plungers to pass over the upper edge of two cards, and feed both of them downwardly into position in the card holding frame when the plungers are lowered.

It is necessary in a machine of this type to provide a safeguard so as to prevent an operation of the machine in the absence of a card in proper position in the card holding frame due to failure of the feeding mechanism or exhaustion of supply. Means are provided herein acting absolutely to lock the machine under such conditions, which means will now be described. Referring to Figs. 1 and 7, it will be seen that a depending pawl 162 is provided, pivoted at 163 to an ear 164 on the cross-beam 11 and normally held yieldingly by spring 165 so that the forward part of its lower end 166, is in the path of a card being fed from the supply receptacle to the card holding frame. This lower end of the pawl is provided with an upper inclined surface 167 so that the lower edge of a card, when being fed from the supply receptacle down to the card holding frame, will, by engaging the inclined surface 167 of the pawl, swing it rearwardly against the tension of its spring 165. The rear end of the lower part 166 of pawl 162 has a shoulder 168 and on its upper surface a projection 169, having an inclined face 178, this shoulder and projection coöperating with a laterally bent end 170 of a locking lever 171 pivoted on shaft 15. The arm 173 of this locking lever 171 coöperates with a lug 174 on the side of the disk 58, carried by the drive shaft 44. The outer surface 176 of this lug is a cam surface starting in notch 177, in which is adapted to engage the extreme end of arm 173. The position of these parts shown in Fig. 7, is of the machine locked from a rotation, as by engagement of the end of arm 173 with a notch 177 of the lug 174, the drive shaft 44, and its disk 58 cannot rotate clockwise, as required, in an operation. The position shown is that which parts would be in if no card had at the previous operation, been transferred from the card supply receptacle to the card holding frame. If, however, a card had been transferred, it by its movement down, would have engaged inclined surface 167 of the pawl 162 swinging it rearwardly, and by engagement of inclined connecting portion 178 between the shoulder 168 and the projection 169 on the rear end of the pawl would serve to cam the adjacent end of lever 171 up, so that its flange 170 will engage in notch 179 adjacent the projection 169. In this position of the forward arm of the lever 171 its arm 173 will be out of engagement with the notch 177 on the disk 58 as shown in Fig. 1 of the drawings. The drive shaft 44 will then be free to be operated from the crank handle so far as this locking mechanism is concerned. However, as soon as the disk 58 starts to rotate clockwise the cam surface 176 of the lug 174 will cam the arm 173 of the locking lever 171 down, thus throwing the flange 170 of this locking lever up to withdraw it from the notch 179 in the pawl 162 and free this pawl. Its spring 165 will then swing it forwardly in the path of the next card to be fed to the card holding frame. Whenever this pawl swings forwardly the rear end of arm 173 of the locking lever, as the lug 174 rides from under it, will be freed whereupon the spring 180 connected with the arm 173 of this lever will rotate the lever back counter clockwise to engage its flange 170 with the shoulder 168 on the pawl 162 and to bring the end of the arm 173 in position to engage the notch 177 in the lug 174, when the drive shaft 44 completes a single rotation. From this description of the locking mechanism it will be seen that the drive shaft 44 of the machine is locked by lever 171 against rotation except when a card has been transferred to the card holding frame at the preceding operation of the machine.

It is, of course, necessary to operate the lever 171 to release the driving shaft for operation when the supply of cards has been exhausted and a new supply is being placed in the supply receptacle. This may be done by manually pushing the pawl 162 rearward far enough to latch the lever 171 in ineffective position or the first card may be manually pushed down into the holding frame until the bottom corners of the card rest upon the ledges 73 of the frame. If the latter course is taken it will prepare the machine to punch a card at the first operation of the driving mechanism and will, on account of the pawl 162 being engaged by the inserted card, latch the locking lever 171 in ineffective position. In any event after the machine has become locked by exhausting the supply of cards it is impossible to release the locking lever 171 to permit operation of the machine without having access to the compartment containing the supply receptacle.

It is thought that the operation of the machine will be clear from the above description. However, this may be here briefly reiterated. Assuming that a card has been transferred to the card holding frame at the preceding operation of the machine, it will be apparent that the locking mechanism just described will not be effective to prevent rotation of the drive shaft. The machine thus being in readiness for the entry of an item, the manipulative levers 3 are adjusted to "set up" the amount of the item in the machine. The left hand lever 3 by its adjustment will determine the class the item to be entered belongs to. This setting up of the amount manipulative levers 3 will be remembered as effective to determine those punches of the punching mechanism that will be effective to punch a card. It will also be remembered that the adjustment of the left hand manipulative lever 3 will shift the card holding means to bring the proper field of the card into position to be punched by the punching mechanism, and will also adjust the left hand type wheel 40, Fig. 14, to record the clerk or department represented by the field in which the punching is effected according to the adjustment of the left hand lever 3.

After the manipulative levers 3 have been properly set, the drive shaft 44 is rotated one complete rotation from a crank handle or any other suitable form of driving means. At the beginning of this rotation of the drive shaft, the operation of punching the card takes place, after which the die carrying frame is restored to normal and then shifted to the left out of the path of the card holding means. At the same time as the shifting of the die plate is effected the left hand or department lever 3, if previously adjusted, is restored to normal together with the card holding frame. The shifting cam of the latter is then effective to move the card holding means forward to deposit the punched card in the receiving receptacle and in the manner described in detail above. The card holding means promptly returns rearward to its normal plane, after which movement and near the end of the operation of the machine, the plunger carrying head is reciprocated to lower a new card from the card supply receptacle into the card holding means for readiness to be punched at the next operation.

After the card holding means has deposited its card in the receiving receptacle and returned to normal position, the die carrying frame is shifted back toward the left of the machine to its normal position, and this is done near the end of the operation of the machine. Transfer of a new card from the card supply receptacle to the card holding means renders the locking means shown and described ineffective so as to permit the next operation of the machine. However, if the card supply receptacle were exhausted of cards, no card would be transferred to the card holding means, and would not thus by its movement serve to render ineffective its coöperating locking mechanism, and the machine would then be locked against any rotation of the drive shaft to carry out the next operation of the machine.

From the previous patent it will be obvious how registering mechanism and printing mechanism will be operated in conjunction with the card punching and storing mechanism herein described. The operation of the printing mechanism conventionally illustrated in Figs. 9 and 10 is the same as that of the previous patent. Due to the notching and staggering of the notches of the cards when in place in the card supply receptacle, and the mode of coöperation between these notches and the feeding plungers on the reciprocating plunger head, it will be seen that assurance of the feeding of but one card to the card holding means at any one operation of the machine, is provided. From an inspection of the card it will be seen that it is by the location of the punched holes in the field of the card punched that the punchings on a card represent any particular item. How this may so represent an item or amount is well known and will not be described. The card of Fig. 8 has four separate punching fields designated as departments A, B, C, and D, though these fields might be designated any other thing desired, such as Class A, Class B, etc. Their particular designation does not affect the disclosure of the invention. Throughout the operation of the machine the cards are always handled inverted from the position shown in Fig. 8 so that the notches 161 will be uppermost. The one beveled corner has no significance so far as the invention is concerned as it is well known in the art and is for the purpose of determining that all cards are in proper position.

While the form of mechanism herein shown and described is admirably adapted to fulfil the objects primarily stated, it is to be understood that it is not intended to confine the invention to the one form of embodiment for it is susceptible of embodiment in various forms all coming within the scope of the claims which follow.

What is claimed is:

1. In a machine of the class described, the combination of manipulatively controlled differential mechanism; card punching mechanism effectively controlled thereby; a card supply receptacle; a card receiving receptacle; means for transferring a card from the card supply receptacle to the punching mechanism; and means for thereafter transferring a punched card from the punching mechanism and storing it in the card receiving receptacle.

2. In a machine of the class described, the combination of manipulatively controlled differential mechanism; card punching mechanism effectively controlled thereby; a card supply receptacle; means for positively carrying a card from the supply receptacle into operative relationship with the punching mechanism at one operation of the machine; means for operating the punching mechanism to punch said card at the next operation of the machine; and means for thereafter at the same operation of the machine in which the card is punched, moving said card to the card receiving receptacle and storing the same therein.

3. In a machine of the class described, the combination of manipulatively controlled differential mechanism; card punching mechanism effectively controlled thereby; a card supply receptacle; card holding means for holding a card in position to be punched by the punching mechanism; a card receiving receptacle for receiving punched cards; means for transferring a card from the supply receptacle to the card holding means; means for operating the punching mechanism to punch a card in the card holding means; and means for thereafter moving the card holding means to carry the punched card and store it in the receiving receptacle.

4. In a machine of the class described, the combination of manipulatively controlled differential mechanism; punching mechanism effectively controlled by the differential mechanism; card holding means for holding a card in coöperative relationship with the punching mechanism so that the latter may punch the card in accordance with the adjustment of the differential mechanism; a card receiving receptacle for storing punched cards; and means for moving the card holding means after its card has been punched to store its card in the card receiving receptacle.

5. In a machine of the class described, the combination of manipulatively controlled differential mechanism; punching mechanism effectively controlled by the differential mechanism for punching the card in conformity with the adjustment of the differential mechanism; card holding means for holding a card in coöperative relationship with the punching mechanism; a card receiving receptacle; means for reciprocating the card holding means to carry its punched card into the receiving receptacle; and means preventing withdrawal of the punched card from the receiving receptacle when the card holding means returns to normal position.

6. In a machine of the class described, the combination of manipulatively controlled differential mechanism; punching mechanism effectively controlled by the adjustment of the differential mechanism; card holding means for holding a card in coöperative relationship with the punching mechanism; means for operating the punching mechanism to punch the card while in the card holding means; a card receiving receptacle; means for retaining cards therein; and means for moving the card holding means after its card has been punched to carry said card past the means for retaining cards in the receiving receptacle so that said retaining means will prevent the removal of the card placed in the receiving receptacle by the card holding means, when the card holding means is moved back to normal position.

7. In a machine of the class described, the combination of manipulatively controlled differential mechanism; punching mechanism effectively controlled by the adjustment of the differential mechanism; a card holding frame for holding a card in coöperative relationship with the punching mechanism; means for operating the punching mechanism; a card receiving receptacle; means for moving the card holding frame after its card has been punched to store the punched card in the receiving receptacle and then returned to normal position; a card supply receptacle; and means for transferring a card from the supply receptacle to the holding means after the return of the latter to normal position, for readiness to be punched at the next operation of the machine.

8. In a machine of the class described, the combination of manipulatively controlled differential mechanism; punching mechanism for punching a card in conformity with adjustment of the differential mechanism; a card supply receptacle; means for yieldingly holding cards therein toward one end of the card supply receptacle; means for transferring the end card in the supply receptacle into position to be punched by the punching mechanism; a card receiving receptacle; yieldingly supported means within the receiving receptacle against which the cards are to be stored; and means for transferring a card when punched by the punching mechanism to the receiving receptacle and securing it therein against the tension of the yieldingly supported means for the cards in the card receiving receptacle.

9. In a machine of the class described, the combination of manipulatively controlled differential mechanism; punching mechanism for punching a card in conformity with adjustment of the differential mechanism; a card supply receptacle; means for yieldingly holding the cards therein toward one end of the card supply receptacle; means for transferring the end card in the supply receptacle into position to be punched by the punching mechanism; a card receiving receptacle; yieldingly supported means within the receptacle against which the cards are to be stored; means for transferring a card when punched by the punching mechanism, to the receiving receptacle and securing it therein against the tension of the yieldingly supported means for the cards in the card receiving receptacle; and retaining means preventing withdrawal of the punched card after being placed in the receiving receptacle but permitting insertion of the card by its transferring means.

10. In a machine of the class described, the combination of manipulatively controlled differential mechanism; card punching mechanism effectively controlled thereby; a card supply receptacle; card holding means for holding a card in position to be punched by the punching mechanism; a card receiving receptacle for receiving punched cards; means for transferring a card from the supply receptacle to the card holding means; means for operating the punching mechanism to punch a card in the card holding means; means for placing the card punching mechanism in condition so as not to obstruct movement of the card holding means; and means for thereafter moving the card holding means to carry the punched card and store it in the receiving receptacle.

11. In a machine of the class described, the combination of manipulatively controlled differential mechanism; card punching mechanism effectively controlled thereby; a card supply receptacle; card holding means for holding a card in position to be punched by the punching mechanism; a card receiving receptacle for receiving punched cards; means for transferring a card from the supply receptacle to the card holding means; means for operating the punching mechanism to punch a card in the card holding means; means for moving a part of the card punching mechanism from between the card holding means and the card receiving receptacle; and means for thereafter moving the card holding means to carry the punched card and store it in the receiving receptacle.

12. In a machine of the class described, the combination of manipulatively controlled differential mechanism; card punching mechanism effectively controlled thereby; a card supply receptacle; card holding means for holding a card in position to be punched by the punching mechanism; a card receiving receptacle for receiving punched cards; means for transferring a card from the supply receptacle to the card holding means; means for operating the punching mechanism to punch a card in the card holding means; supporting means for a part of the card punching mechanism normally supporting such part between the card holding means and the card receiving receptacle; means for shifting said part of the punching mechanism laterally of the machine on its supporting means, after the card in the card holding means has been punched by the punching mechanism; and means for thereafter moving the card holding means to carry its punched card to the receiving receptacle.

13. In a machine of the class described, the combination of manipulatively controlled differential mechanism; card punching mechanism effectively controlled thereby; a card supply receptacle; card holding means for holding a card in position to be punched by the punching mechanism; a card receiving receptacle for receiving punched cards; means for transferring a card from the supply receptacle to the card holding means; means for operating the punching mechanism to punch a card in the card holding means; a shaft for slidably supporting a part of the card punching mechanism normally holding said part between the card in the card holding means and the receiving receptacle; and means for shifting such part of the card punching mechanism laterally on its shaft to permit free movement of the punched card in the card holding means to the card receiving receptacle.

14. In a machine of the class described, the combination of manipulatively controlled differential mechanism; card punching mechanism effectively controlled thereby; a card supply receptacle; card holding means for holding a card in position to be punched by the punching mechanism; a card receiving receptacle for receiving punched cards; means for transferring a card from the supply receptacle to the card holding means; means for operating the punching mechanism to punch a card in the card holding means; a shaft slidably supporting a part of the card punching mechanism and normally holding such part between the card holding means and the receiving receptacle; means for shifting said part of the card punching mechanism laterally on its supporting shaft after the punching mechanism is operated to punch the card in the card holding means; and means for thereafter moving the card holding means to deposit the punched card in the receiving receptacle.

15. In a machine of the class described, the combination of manipulatively controlled differential mechanism; card punching mechanism effectively controlled thereby; a card supply receptacle; card holding means for holding a card in position to be punched by the punching mechanism; a card receiving receptacle for receiving punched cards; means for transferring a card from the supply receptacle to the card holding means; means for operating the punching mechanism to punch a card in the card holding means; supporting means for a part of the card punching mechanism normally holding said part between the card in the card holding means and the receiving receptacle; means for shifting said part of the punching mechanism laterally on its supporting means to carry said part from between the punched card and the receiving receptacle; means for thereafter moving the card holding means to deposit the punched card in the receiving receptacle and then return to normal position; and means for then returning the shifted part of the card punching mechanism to its normal position between the card holding means and the card receiving receptacle.

16. In a machine of the class described, the combination of manipulatively controlled differential mechanism; card punching mechanism effectively controlled thereby; a card supply receptacle; card holding means for holding a card in position to be punched by the punching mechanism; a card receiving receptacle for receiving punched cards; means for transferring a card from the supply receptacle to the card holding means; means for operating the punching mechanism to punch a card in the card holding means; supporting means for a part of the card punching mechanism normally supporting said part between the card in the card holding means and the receiving receptacle; means for shifting said part of the punching mechanism laterally on its supporting means to carry said part from between the punched card and the receiving receptacle; means for thereafter moving the card holding means to deposit the punched card in the receiving receptacle and then return to normal position; means for then returning the shifted part of the card punching mechanism to its normal position between the card holding means and the card receiving receptacle; and means for transferring a card from the card supply receptacle to the card holding means after the latter has deposited its punched card in the card receiving receptacle and returned to normal position.

17. In a machine of the class described, the combination of manipulatively controlled card punching mechanism; card holding means having opposed grooves for engaging the card on its vertical edges and ledges for supporting the card at its lower corners; a card receiving receptacle; means for moving the card holding means to place a card after it is punched, in the card receiving receptacle; and means for retaining the transferred card in the receiving receptacle serving to withdraw the card from engagement in the vertical opposed grooves of the card holding means, and from above the supporting ledges on the card holding means, when said card holding means is returned to normal position.

18. In a machine of the class described, the combination of card punching mechanism; card holding means for holding a card vertically in position to be punched by the punching mechanism, said card holding means having vertical opposed grooves for engaging the vertical edges of the card to be punched and having a ledge for supporting the card from the bottom; a card receiving receptacle; means for moving the card holding means after the card in it has been punched by the punching mechanism, to carry the punched card into the receiving receptacle; and retaining pawls associated with the card receiving receptacle acting to engage in front of the transferred card as it is placed in the receiving receptacle and serving when the card holding means is subsequently withdrawn to normal position, to pull said card out of the opposed grooves in the card holding means and off of the supporting ledge in the card holding means, and to retain it supported by the floor of the receptacle when the card holding means returns to normal position.

19. In a machine of the class described, the combination of card punching mechanism; card holding means for holding a card vertically in position to be punched by the punching mechanism, said card holding means having vertical opposed grooves for engaging the vertical edges of the card to be punched and having a ledge for supporting the card from the bottom; a card receiving receptacle; means for moving the card holding means after the card in it has been punched by the punching mechanism, to carry the punched card into the receiving receptacle; retaining pawls associated with the card receiving receptacle acting to engage in front of the transferred card as it is placed in the receiving receptacle and serving when the card holding means is subsequently withdrawn to normal position, to pull said card out of the opposed grooves in the card holding means and off the supporting ledge in the card holding means, and to retain it supported by the floor of the receptacle when the card holding means returns to normal position; and means for transferring a new card to the card holding means after the latter returns to normal position.

20. In a machine of the class described, the combination of card punching mechanism; card holding means for holding a card vertically in position to be punched by the punching mechanism, said card holding means having vertical opposed grooves for engaging the vertical edges of the card to be punched and having a ledge for supporting the card from the bottom; a card receiving receptacle; means for moving the card holding means after the card in it has been punched by the punching mechanism, to carry the punched card into the receiving receptacle; retaining pawls associated with the card receiving receptacle acting to engage in front of the transferred card as it is placed in the receiving receptacle and serving when the card holding means is subsequently withdrawn to normal position, to pull said card out of the opposed grooves in the card holding means and off the supporting ledge in the card holding means and retain it supported by the floor of the receptacle when the card holding means returns to normal position; a card supply receptacle above the card holding means; and means for moving a single card from the supply receptacle down the opposing grooves of the card holding means against the supporting ledge of the latter, after the card holding means returns to normal position, thus positioning a card in the card holding means for subsequent punching by the punching mechanism.

21. In a machine of the class described, the combination of manipulatively controlled card punching mechanism; a card holding means having opposed vertical grooves and a supporting ledge for holding a card in position to be punched by the punching mechanism; a card supply receptacle adapted to hold a supply of cards in vertical position above the card holding means; a vertically reciprocable head adapted to be moved up and down in front of the foremost card in the card supply receptacle; and a yielding plunger carried by the head with its end in yielding engagement with the front of the foremost card as the head moves up, said plunger adapted to engage over the top edge of said foremost card when the plunger head reaches the limit of its upward stroke so as to serve when the plunger head and plunger is again lowered, to positively carry the foremost card in the supply receptacle with its edges down the opposed vertical grooves in the card holding means and lower the card in the card holding means so that it will rest in place in the same on the supporting ledge of the card holding means.

22. In a machine of the class described, the combination of a card supply receptacle open at one end; cards arranged vertically in the card supply receptacle and alternately notched on their upper edges so as to form a plurality of rows of alined notches, adjacent notches of a row being separated by an intermediate card whose notch alines with another row of notches; and a plurality of vertically movable yieldingly mounted plungers separated in correspondence with the separation of the rows of notches and adapted to be raised with their ends in yielding engagement with the front side of the first adjacent card to engage one of the plungers within the notch in the upper edge of the said card and then be lowered so that said plunger will by its engagement in said notch positively move the said card from the card supply receptacle, the said card serving to prevent engagement of plungers not alined with the notch in the card with the cards having notches alined with said plungers, and the card immediately back of the first adjacent card not having a notch in alinement with the notch in the foremost card serving to prevent the effective plunger from engaging over the upper edge of any but the first adjacent card thus to prevent the effective plunger from carrying any but the said first card from position in the card supply receptacle.

23. In a machine of the class described, the combination of a card supply receptacle; a series of differentially notched cards mounted on edge in the supply receptacle and arranged alternately in said receptacle; a card holding frame movable in two directions and in reverse during a card carrying operation and adapted to engage in a notch in the first card only to detach the cards singly from the card supply receptacle, a plunger carried by said card holding means, said plunger maintaining the card in fixed position in the frame until disposed in a storage receptacle.

24. In a machine of the class described, the combination of a pack of cards; and feeding means with a plurality of plungers thereon comprising a card holding frame for singly transferring cards from the pack;

said feeding means and cards being constructed and arranged so that the card adjacent the first card of the pack serves to prevent feeding engagement between one of the plungers and any of the cards except the first one while the first card prevents contact of another plunger with any other card.

25. In a machine of the class described, the combination of a card supply receptacle; cards arranged therein vertically and notched at their upper edges so that alternate cards have notches alined thus forming two rows of notches in the upper edges of the group of cards; a reciprocable feeding head contacting with the card substantially only upon the edge thereof upon three sides and carrying said card after separation from the supply receptacle to perforating position and to storage position; and a plurality of plungers carried by said head one alined with each row of notches, that plunger alined with the notch in the first card adapted only to form a feeding engagement with the first card to feed the same from the supply receptacle and contacting the card on the fourth side thereof, the other plunger being kept ineffective for feeding by said first card, so that but one card will be fed from the supply receptacle at each complete reciprocation of the card feeding means.

26. In a machine of the class described, the combination of a card supply receptacle; cards mounted therein so that adjacent cards can coöperate with feeding mechanism at different points; and a feeding mechanism having a plurality of card engaging elements only one of which can become effective in feeding while contacting but not feeding a second card, the first card serving to render ineffective any feeding element not in position to coöperate to feed the first card, said feeding mechanism having a notched edge contacting portion preventing displacement therefrom laterally while held from vertical displacement by the plunger.

27. In a machine of the class described, the combination of a pack of cards each having an opening; and feeding means for singly transferring the cards from the pack while securely holding them by edge contact during said transfer, including a plurality of feeding elements for engaging in the openings in the cards, said elements being rendered singly effective at any feeding operation of the machine, under the control of the opening in the first card, and means moving said feeding means in one plane while transferring the cards from the pack to punching position and means to move them from said plane to a storage position.

28. In a machine of the class described, the combination of manipulatively controlled amount differential mechanism; card punching mechanism effectively controlled thereby; a card supply receptacle; a card receiving receptacle; means for transferring a card from the card supply receptacle to the punching mechanism; means for adjusting the card in the punching mechanism so that the latter may punch the card in any desired punching field of the card; and means for thereafter transferring a punched card from the punching mechanism and storing it in the card receiving receptacle.

29. In a machine of the class described, the combination of manipulatively controlled card punching mechanism; means for feeding a card to the punching mechanism at each operation of the machine; and manipulatively controlled means for effecting a relative adjustment between the card in the punching mechanism and the punching mechanism to select the punching field of the card desired to be punched, thus to classify the item entered on the card by the punching in the latter.

30. In a machine of the class described, the combination of manipulatively controlled card punching mechanism; means for feeding a card to the punching mechanism at each operation of the machine; and manipulatively controlled means for adjusting the card in the punching mechanism to select the punching field of the card desired to be punched thus to classify the item entered on a card by the punching in the latter.

31. In a machine of the class described, the combination of manipulatively controlled card punching mechanism; means for feeding a card to the punching mechanism at each operation of the machine; manipulatively controlled means for adjusting the card in the punching mechanism to select the punching field of the card desired to be punched thus to classify the item entered on a card by the punching in the latter; and means for transferring the punched card from the punching mechanism.

32. In a machine of the class described, the combination of manipulatively controlled card punching mechanism; means for feeding a card to the punching mechanism at each operation of the machine; manipulatively controlled means for adjusting the card in the punching mechanism to select the punching field of the card desired to be punched thus to classify the item entered on a card by the punching in the latter; a card receiving receptacle; and means for transferring the punched card to the card receiving receptacle.

33. In a machine of the class described, the combination of manipulatively controlled card punching mechanism; a card supply receptacle; means for transferring a card from the card supply receptacle to the card punching mechanism at each operation of the machine; means for effecting relative adjustment between the card punching mechanism and the card in it to determine the one of a number of punching fields in the card that the item is to be punched in; a card receiving receptacle; and means for transferring a card when punched by the punching mechanism to store the punched card in the receiving receptacle.

34. In a machine of the class described, the combination of a plurality of rows of punches; a movable die plate provided with a plurality of rows of die openings adapted to aline with the punches; means for inserting a card between the die plate and the cutting ends of the punches; manipulatively controlled means for selectively supporting the punches against movement away from the card; and means for carrying the die plate against the card and the latter against the cutting ends of the punches so that the selected effective punches will, by coöperation of their cutting ends with their alined die openings, punch holes in the card to be punched.

35. In a machine of the class described, the combination of a plurality of rows of punches; a movable die plate provided with a plurality of rows of die openings adapted to aline with the punches; means for inserting a card between the die plate and the cutting ends of the punches; manipulatively controlled means for selectively supporting the punches against movement away from the card; means for carrying the die plate against the card and the latter against the cutting ends of the punches so that the selected effective punches will by coöperation of their cutting ends with their alined die openings punch holes in the card to be punched; and manipulative means for effecting a relative adjustment between the card and the set of punches so that the card may be punched by the punching mechanism in any desired one of a number of punching fields in the card.

36. In a machine of the class described, the combination of card punching mechanism; means for transferring a card at one operation of the machine into position in the card punching mechanism for readiness to be punched at the next operation of the machine; and means controlled by the transfer of a card to the punching mechanism, for controlling the operability of the machine for the next operation.

37. In a machine of the class described, the combination with an operating mechanism, of record material punching mechanism, effective upon each operation of said operating mechanism, means for bringing record material into coöperative relation with said punching mechanism, and means for effecting a relative movement between said punching mechanism and record material to effect a punching at any desired point on said material.

38. In a machine of the class described, the combination with an operating mechanism, of record material punching mechanism, means for bringing record material into coöperative relation with said punching mechanism, and manipulative means operable as a preliminary to an operation of the operating mechanism to effect a relative movement between said record material and punching mechanism whereby the punching will be effected at any desired point on the record material.

39. In a machine of the class described, the combination with a supply receptacle for unpunched cards, of a storage receptacle for punched cards, devices for introducing the punched cards into the storage receptacle, means for moving cards from the supply receptacle into engagement with said devices, and differentially actuated devices for punching the cards before they are introduced into the storage receptacle.

40. In a machine of the class described, the combination with a supply receptacle for unpunched cards, of a storage receptacle for punched cards, a set of punches, devices for moving cards from the supply receptacle into position to be acted upon by the punches, means for carrying the cards away from the punches and into the storage receptacle, and differentially actuated mechanism for operating the punches, the means and the devices successively and in the order stated.

41. In a machine of the class described, the combination with a supply receptacle for cards, of an invariably moved card feeding device carrying a plurality of card engaging elements contacting said cards upon one edge and means for contacting said cards throughout the three remaining edges, and a plurality of cards each having a notch to be engaged by one of the engaging elements, the notches in no two adjacent cards being in alinement with the same engaging element, means for driving said card feeding device in two directions and return.

42. In a machine of the class described, the combination with accounting mechanism, of means for feeding a card to the accounting mechanism at one operation of the machine in readiness to have an entry made on the card by the accounting mechanism at the next operation of the machine, and means controlled by the transfer of a card to the accounting mechanism for controlling the operability of the machine for the next operation.

43. In a machine of the class described, the combination with a supply receptacle for unpunched cards, of a storage receptacle for punched cards, a set of plungers, devices for moving cards from the supply receptacle into position to be acted upon by the plungers, means for carrying the cards away from the plungers and into the storage receptacle, differentially actuated mechanism for operating the plungers and manipulative devices for controlling the said operating mechanism.

In testimony whereof we affix our signatures in the presence of two witnesses.

THOMAS CARROLL.
JOHN C. LOCKYER.

Witnesses:
F. E. HAMILTON,
J. B. RICKETTS.